US010926722B2

(12) United States Patent
Mizutani

(10) Patent No.: US 10,926,722 B2
(45) Date of Patent: Feb. 23, 2021

(54) ON-BOARD COMMUNICATION DEVICE, ON-BOARD COMMUNICATION SYSTEM, AND SPECIFIC PROCESSING PROHIBITION METHOD FOR A VEHICLE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventor: Tomohiro Mizutani, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 109 days.

(21) Appl. No.: 15/781,603

(22) PCT Filed: Nov. 30, 2016

(86) PCT No.: PCT/JP2016/085522
§ 371 (c)(1),
(2) Date: Jun. 5, 2018

(87) PCT Pub. No.: WO2017/098976
PCT Pub. Date: Jun. 15, 2017

(65) Prior Publication Data
US 2019/0315295 A1 Oct. 17, 2019

(30) Foreign Application Priority Data
Dec. 9, 2015 (JP) .............................. JP2015-240294

(51) Int. Cl.
*B60R 16/023* (2006.01)
*H04W 4/48* (2018.01)
(Continued)

(52) U.S. Cl.
CPC ........ *B60R 16/0234* (2013.01); *G07C 5/0808* (2013.01); *H04W 4/48* (2018.02); *H04W 12/06* (2013.01)

(58) Field of Classification Search
CPC .... H04W 4/48; B60R 16/0234; B60R 16/023; G07C 5/0808
(Continued)

(56) References Cited

U.S. PATENT DOCUMENTS 4,795,893 A * 1/1989 Ugon ..................... G07B 13/02
235/382
7,305,511 B2 * 12/2007 Barrett, Jr. .......... G06F 13/4022
710/316
(Continued)

FOREIGN PATENT DOCUMENTS

JP 2013-141146 A 7/2013
WO WO-2013141146 A1 * 9/2013 ............ H04W 72/04

OTHER PUBLICATIONS

Search Report for PCT/JP2016/085522, dated Feb. 21, 2017.

*Primary Examiner* — David J Pearson
*Assistant Examiner* — Badri Champakesan
(74) *Attorney, Agent, or Firm* — Honigman LLP

(57) ABSTRACT

An on-board communication device, an on-board communication system, and a specific processing prohibition method for a vehicle, in which a specific service can be prevented from being provided without limitation is disclosed. The on-board communication system can perform update processing of a relay processing program for a gateway using a wireless communication path through a wireless communication device or a communication path through a communication cable connected to a connector unit. When receiving an authentication request through either of the two communication paths, the gateway performs authentication processing, and if the authentication
(Continued)

processing was successful, the gateway receives an update relay processing program through this communication path, and performs update processing by overwriting a stored relay processing program. At this time, the gateway prohibits update processing through any communication path other than the communication path through which the authentication processing was performed.

7 Claims, 5 Drawing Sheets

(51) Int. Cl.
*G07C 5/08* (2006.01)
*H04W 12/06* (2009.01)

(58) Field of Classification Search
USPC .......................................................... 726/2
See application file for complete search history.

(56) References Cited

U.S. PATENT DOCUMENTS

| | | | | |
|---|---|---|---|---|
| 7,840,710 B2* | 11/2010 | Barker | ................ | H04L 67/1095 709/248 |
| 8,831,567 B2* | 9/2014 | Kim | ..................... | G06F 9/4406 455/411 |
| 8,831,821 B2* | 9/2014 | Downs, Jr. | .............. | H04L 67/12 701/33.7 |
| 9,197,413 B1* | 11/2015 | Hall, III | .................. | H04W 4/48 |
| 9,413,732 B2* | 8/2016 | Koide | ................ | H04L 63/0442 |
| 9,497,197 B2* | 11/2016 | Kus | ........................ | H04L 63/168 |
| 9,635,518 B2* | 4/2017 | Lee | ........................... | H04Q 9/00 |
| 10,263,976 B2* | 4/2019 | Loehr | .............. | H04W 12/0802 |
| 10,554,623 B2* | 2/2020 | Inoue | ................ | H04L 12/40013 |
| 2003/0177371 A1* | 9/2003 | Rothrock | ................ | G06F 21/51 713/189 |
| 2004/0258051 A1* | 12/2004 | Lee | ..................... | H04L 12/4011 370/352 |
| 2005/0097368 A1* | 5/2005 | Peinado | ................. | G06F 21/10 726/4 |
| 2005/0210281 A1* | 9/2005 | Enomoto | ................ | H04L 63/08 726/22 |
| 2010/0318677 A1* | 12/2010 | Bellwood | .............. | H04N 21/84 709/238 |
| 2013/0211658 A1* | 8/2013 | Bonefas | ................. | B65G 67/24 701/28 |
| 2014/0075517 A1* | 3/2014 | Alrabady | ................ | G06F 21/572 726/4 |
| 2014/0196114 A1* | 7/2014 | Hirashima | ............ | G06F 21/445 726/4 |
| 2015/0180840 A1* | 6/2015 | Jung | ....................... | H04L 67/34 713/150 |
| 2015/0222639 A1* | 8/2015 | Dulkin | ................... | H04L 63/08 726/3 |
| 2015/0358329 A1* | 12/2015 | Noda | .................. | H04W 12/0802 726/4 |
| 2018/0048473 A1* | 2/2018 | Miller | ................... | H04L 9/3247 |

\* cited by examiner

ON-BOARD COMMUNICATION DEVICE, ON-BOARD COMMUNICATION SYSTEM, AND SPECIFIC PROCESSING PROHIBITION METHOD FOR A VEHICLE

CROSS-REFERENCE TO RELATED APPLICATIONS

This application is the U.S. national stage of PCT/JP2016/085522 filed Nov. 30, 2016, which claims priority of Japanese Patent Application No. 2015-240294 filed on Dec. 9, 2015, which is incorporated herein by reference in its entirety.

FIELD OF THE INVENTION

The present description relates to an on-board communication device and an on-board communication system that are mounted in a vehicle, and a specific processing prohibition method for a vehicle that prohibits specific processing performed in the vehicle, the method using the above device and system.

BACKGROUND OF THE INVENTION

In JP 2015-151681A, for example, a communication device is proposed, in which a region where a vehicle can be controlled can be limited when a person other than an owner of the vehicle has a valet key that performs authentication with a vehicle control device when wireless communication with a legitimate key is established, as a device for performing authentication with the vehicle control device only within a range in which communication with the legitimate key is possible.

Also, in JP 2015-153258A, for example, a vehicle-use personal authentication system has been proposed that includes a smart key for controlling a vehicle and authenticates an operator operating the smart key. In this system, the smart key includes a voice acquisition unit, and the vehicle includes an apparatus authentication unit for performing apparatus authentication between the smart key and the vehicle, a personal authentication unit for performing personal authentication of the operator if the apparatus authentication has been successful, and an execution unit that executes processing in accordance with a command generated based on the voice acquired by the voice acquisition unit if the personal authentication was successful. The personal authentication unit selects one authentication mode from at least two authentication modes with different authentication intensity based on a command generated based on the acquired voice, and performs personal authentication based on the selected authentication mode.

In this way, in recent vehicles, authentication processing is performed in various positions for the purpose of improving security.

SUMMARY OF THE INVENTION

Conventionally, when performing processing such as vehicle diagnosis and updates of an on-board apparatus, for example, a diagnosis device provided in e.g. a car dealer or a maintenance factory is connected by wire to a specific port mounted in a vehicle or e.g. the on-board apparatus. A worker in e.g. the dealer or the maintenance factory can perform processing such as vehicle diagnosis and updates of the on-board apparatus by operating the diagnosis device connected by wire. In such a vehicle diagnosis system, when the diagnosis device is connected to the specific port, authentication processing is performed between the diagnosis device and the vehicle or e.g. the on-board apparatus. If the authentication processing was successful, the vehicle or e.g. the on-board apparatus shifts to a specific mode such as a diagnosis mode and enters a state where a specific service can be provided that carries a risk when abused in the diagnosis device.

In recent years, in accordance with improvement and generalization of wireless communication technology, a vehicle diagnosis system that performs processing such as vehicle diagnosis and updates of the on-board apparatus using wireless communication has been proposed and developed. In such a system as well, a conventional configuration in which a diagnosis device is connected to a specific port remains. For this reason, it is possible to perform processing such as vehicle diagnosis and updates of the on-board apparatus using two methods, namely remote operation through wireless communication and operation through connection to a diagnosis device. However, a conventional vehicle, an on-board apparatus or the like enters a state where a specific service can be provided without limitation after shifting to a specific mode due to succeeding in authentication processing, and thus there is a risk that, after succeeding in the authentication processing through connection to the diagnosis device, the specific service will be provided to a wireless communication device with which authentication processing has not been performed, for example.

The present description has been conceived in view of the above circumstances, and an objective thereof is to provide an on-board communication device, an on-board communication system, and a specific processing prohibition method for a vehicle that can prevent a specific service from being provided without limitation in a vehicle or e.g. an on-board apparatus that provides a specific service if authentication processing was successful.

An on-board communication device according to the present description is an on-board communication device that is mounted in a vehicle and is provided with a plurality of communication processing units that each perform communication processing through a predetermined communication path, the on-board communication device including: an authentication processing unit that performs authentication processing with another device when there is an authentication processing request from the other device through one communication path; a specific processing unit that performs specific processing with the other device through the one communication path if the authentication processing performed by the authentication processing unit was successful; and a prohibition unit that prohibits the specific processing through any communication path other than the one communication path if the authentication processing performed by the authentication processing unit was successful.

Furthermore, in the on-board communication device according to the present description, the prohibition unit may also prohibit authentication processing with the authentication processing unit based on an authentication processing request given through any communication path other than the one communication path.

Furthermore, in the on-board communication device according to the present description, the specific processing performed by the specific processing unit may also be processing for updating a program or data stored in a device mounted in the vehicle using a program or data received from the other device through the one communication path.

Furthermore, in the on-board communication device according to the present description, the specific processing performed by the specific processing unit may also be processing for transmission/reception of information for operation verification to/from the device mounted in the vehicle.

Furthermore, in the on-board communication device according to the present description, the plurality of communication paths through which the plurality of the communication processing units perform communication processing include a communication path through which wireless transmission/reception of information to/from a device outside of the vehicle is performed.

Furthermore, in the on-board communication device according to the present description, the plurality of communication paths through which the plurality of the communication processing units perform communication processing may also include a communication path through which transmission/reception of information is performed to/from another device that is attachably/removably connected to a connection unit provided in the vehicle, through the connection unit.

Furthermore, an on-board communication system according to the present description is an on-board communication system that is mounted in a vehicle and is provided with a plurality of communication processing units that each perform communication processing through a predetermined communication path, the on-board communication system including: an authentication processing unit that performs authentication processing with another device when there is an authentication processing request from the other device through one communication path; a specific processing unit that performs specific processing with the other device through the one communication path if the authentication processing performed by the authentication processing unit was successful; a prohibition unit that prohibits the specific processing through a communication path other than the one communication path if the authentication processing performed by the authentication processing unit was successful.

Furthermore, a specific processing prohibition method for a vehicle according to the present description is performed by an on-board communication device that is mounted in a vehicle and is provided with a plurality of communication processing units that each perform communication processing through a predetermined communication path, the specific processing prohibition method for a vehicle comprising: performing authentication processing with the other device when there is an authentication processing request from another device through one communication path; performing specific processing with the other device through the one communication path if the authentication processing performed by the authentication processing unit was successful; and prohibiting the specific processing through any communication path other than the one communication path if the authentication processing performed by the authentication processing unit was successful.

The on-board communication device (or on-board communication system) according to the present description can perform transmission/reception of information through the plurality of communication paths and is provided with a plurality of communication processing units (or communication devices) that each perform communication processing through a predetermined communication path. When there is an authentication processing request from another device through one communication path, the on-board communication device performs authentication processing through transmission/reception of information through this communication path. If the authentication processing was successful, the on-board communication device performs specific processing between the other device through one communication path and prohibits the specific processing through a communication path other than the one communication path. By doing this, the on-board communication device that succeeded in the authentication processing with the other device through the one communication path performs the specific processing through only the one communication path and does not perform the specific processing through a communication path other than the one communication path, and thus the specific processing can be prevented from being performed without limitation.

Furthermore, the on-board communication device according to the present description, if the authentication processing with another device through one communication path was successful, may prohibit authentication processing through a communication path other than the one communication path. By doing this, devices excluding the other device that succeeded in the authentication processing cannot perform authentication processing with the on-board communication device, and thus the specific processing can be more reliably prevented from being performed without limitation.

Furthermore, the on-board communication device according to the present description may receive a program from the other device that succeeded in authentication processing through one communication path, and may perform update processing on a device (the on-board communication device itself or another on-board device) mounted in the vehicle using this program. Such update processing needs to be performed exclusively, and thus is preferable as the specific processing performed by the on-board communication device according to the present description.

Furthermore, according to the present description, the plurality of communication paths to be used for communication processing performed by the on-board communication device may include a communication path that performs wireless communication with the device outside of the vehicle. By doing this, the on-board communication device can realize processing such as vehicle diagnosis and updates of the on-board device through remote operation through wireless communication.

Furthermore, according to the present description, the vehicle may be provided with the connection unit for attachably/removably connecting the other device, and the plurality of communication paths to be used for communication processing of the on-board communication device may include a communication path through which information is transmitted/received with the other device through the connection unit. By doing this, it is possible that a device for processing such as vehicle diagnosis or updates of an on-board device can be connected in e.g. a car dealer or a maintenance factory, and these processings can be performed by the on-board communication device.

According to the present description, with a configuration in which, when the specific processing is performed after succeeding in the authentication processing through one communication path, the specific processing through any communication path other than the one communication path is prohibited, it is possible to prevent the specific processing from being performed without limitation, and thus the security performance of the vehicle can be improved.

DETAILED DESCRIPTION OF THE PREFERRED EMBODIMENTS

Figure 1:
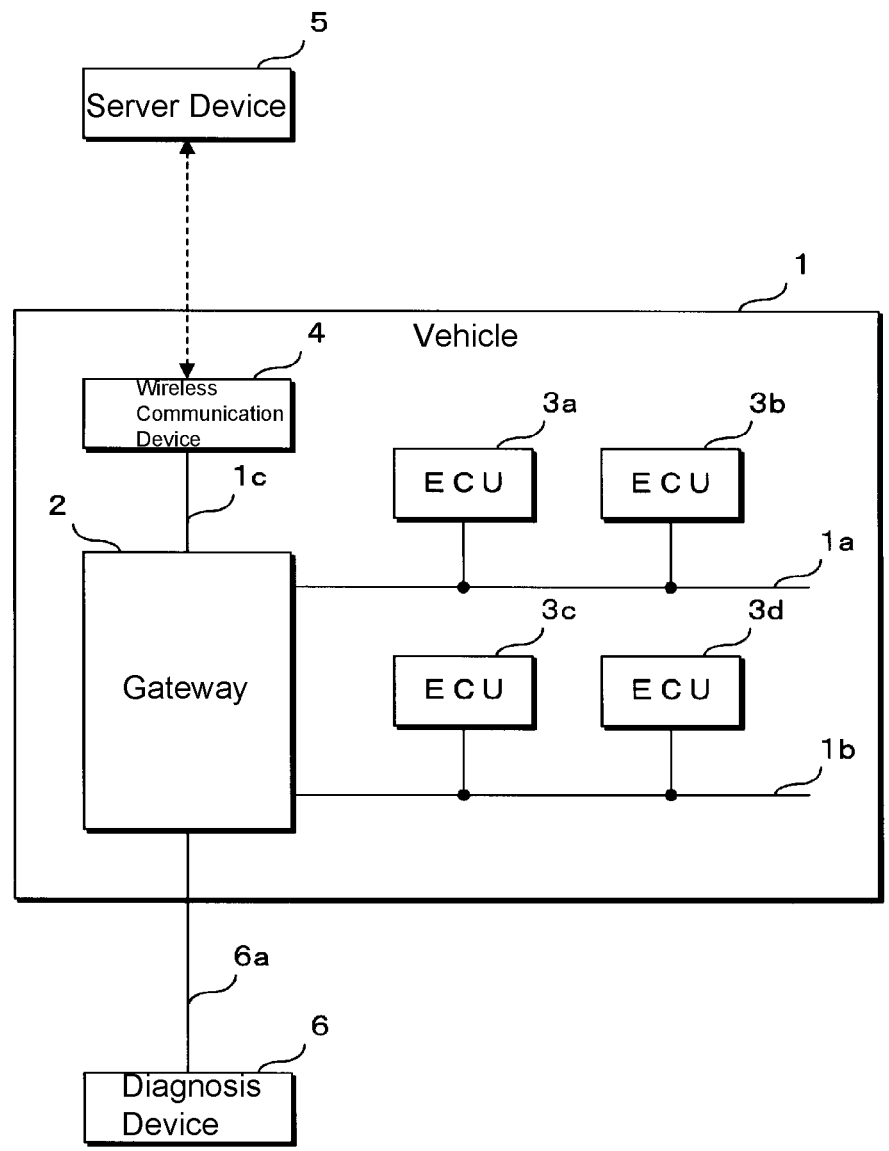
FIG. 1 is a block diagram showing a configuration of an on-board communication system according to one embodiment.

In the following, the present description will be described specifically with reference to the drawings illustrating the embodiments. FIG. 1 is a block diagram showing a configuration of an on-board communication system according to one embodiment. The on-board communication system according to this embodiment is constituted by a gateway 2, a plurality of ECUs (Electronic Control Units) 3a to 3d, and a wireless communication device 4, all of which are mounted in a vehicle 1. The plurality of devices mounted in the vehicle 1 are connected to communication lines 1a to 1c arranged inside the vehicle 1 as appropriate, and they can communicate with each other through these communication lines. The gateway 2 and the two ECUs 3a and 3b are connected to the communication line 1a, and they can communicate with each other through the communication line 1a. The gateway 2 and the two ECUs 3c and 3d are connected to the communication line 1b, and they can communicate with each other through the communication line 1b. Also, the gateway 2 to which the two communication lines 1a and 1b are connected performs processing for relaying communication between the two communication lines 1a and 1b. By doing this, the ECUs 3a and 3b and the ECUs 3c and 3d can communicate with each other.

The ECUs 3a to 3d may be various ECUs such as ECUs for controlling engine operation of the vehicle 1, ECUs for controlling turning on/off of lights, and ECUs for performing control relating to ABS (Antilock Brake System). The ECUs 3a to 3d communicate with the other ECUs 3a to 3d through the communication lines 1a, 1b and the gateway 2, obtain necessary information, and perform processing of their own.

The wireless communication device 4 performs wireless communication, for example, via a network such as a portable phone communication network or a wireless LAN (Local Area Network). In this embodiment, the vehicle 1 communicates with a server device 5 using a wireless communication device 4. The wireless communication device 4 is connected to the gateway 2 in one-to-one connection via the communication line 1c arranged inside the vehicle 1. The wireless communication device 4 transmits information given from the gateway 2 to the server device 5, and also gives information received from the server device 5 to the gateway 2. The gateway 2 relays communication with the server device 5 via the wireless communication device 4 and communication with the ECUs 3a to 3d via the communication lines 1a and 1b. By doing this, for example, the ECU 3a can communicate with the server device 5 via the gateway 2 and the wireless communication device 4.

The server device 5 is a device that is managed and operated by e.g. a manufacturer, a dealer, or a maintenance factory, of the vehicle 1. The server device 5, for example, can perform processing for collecting and accumulating various kinds of information (e.g. driving information or diagnosis information) to be used inside the vehicle 1. Also, the server device 5 can perform processing for distributing information to be used in the vehicle 1, for example. In this embodiment, the server device 5 can perform updates of the gateway 2 by transmitting a program to be executed by the gateway 2 to the vehicle 1.

A diagnosis device 6 is attachably/removably connected with a connection cable 6a to a connector unit 25 (shown in FIG. 2) provided at an appropriate position in the vehicle 1. The diagnosis device 6 is a device for diagnosing e.g. whether there is a failure, by obtaining various kinds of information from the vehicle 1 connected thereto. Also, in this embodiment, the diagnosis device 6 can update the gateway 2 by transmitting a program to be executed by the gateway 2 to the vehicle 1.

Figure 2:
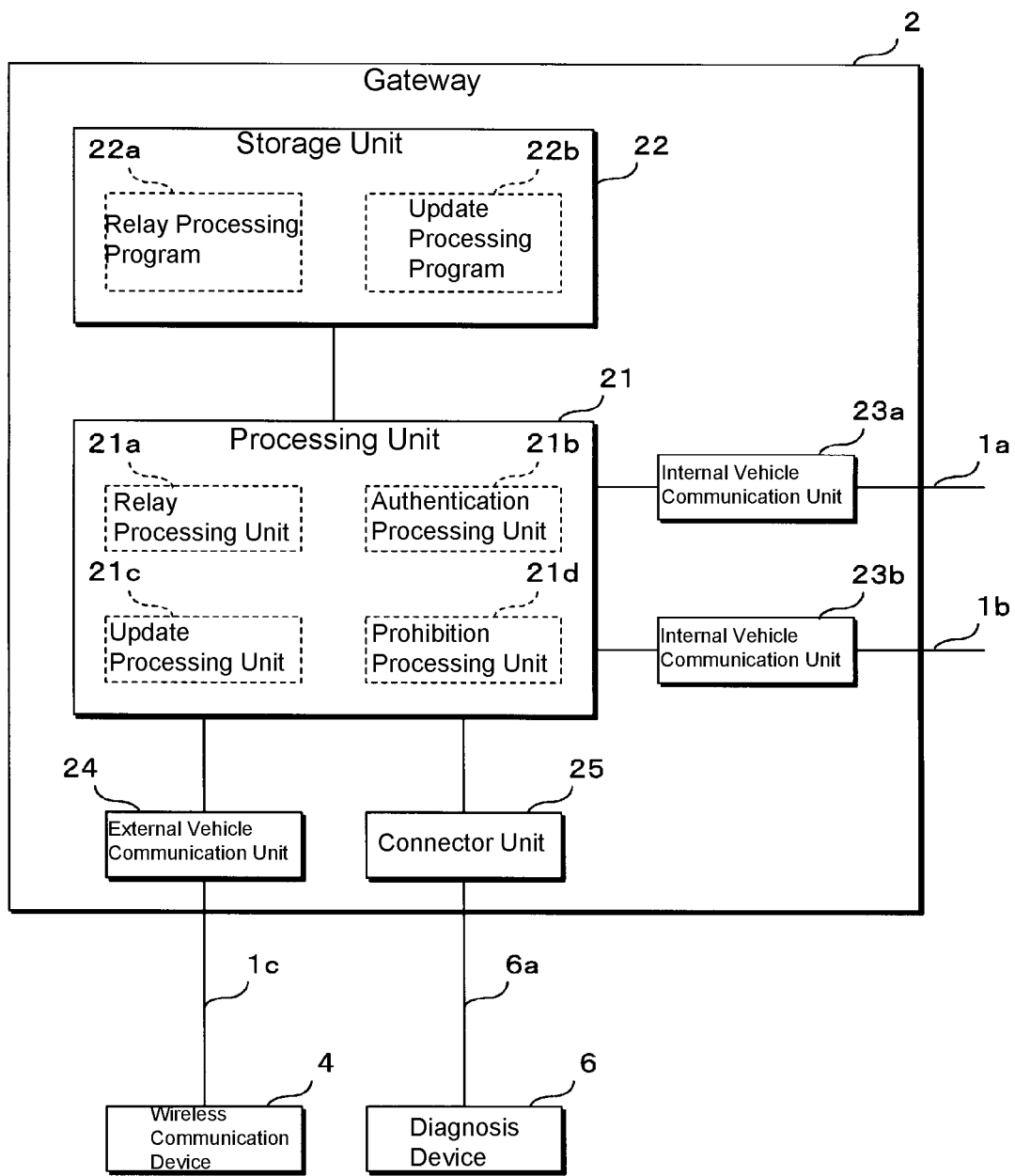
FIG. 2 is a block diagram showing a configuration of a gateway according to this embodiment.

FIG. 2 is a block diagram showing a configuration of the gateway 2 according to this embodiment. The gateway 2 according to this embodiment is constituted by a processing unit 21, a storage unit 22, internal vehicle communication units (units for communication inside the vehicle) 23a and 23b, an external vehicle communication unit (unit for communication with the outside of the vehicle) 24, and the connector unit 25, etc. The processing unit 21 is constituted by a calculation processing device such as a CPU (Central Processing Unit), and by reading and executing various types of programs stored in the storage unit 22, performs processing such as processing for relaying communication between the inside and outside of the vehicle 1, and processing for updating its own programs.

The storage unit 22 is constituted by a data-rewritable and non-volatile memory element such as a flash memory. The storage unit 22 stores various types of programs to be executed by the processing unit 21, and various types of data necessary for executing these programs, for example. In this embodiment, the storage unit 22 stores a relay processing program 22a and an update processing program 22b. The relay processing program 22a is a program for realizing processing relating to normal operation of the gateway 2, and performs, for example, relay processing of communication between the plurality of communication lines 1a and 1b of the vehicle 1, and relay processing of communication between the inside and outside of the vehicle 1 through the wireless communication device 4. The update processing program 22b is a program for realizing update processing of the gateway 2. The update processing program 22b updates the relay processing program 22a by overwriting the relay processing program 22a stored in the storage unit 22 with a new update relay processing program 22a given from the server device 5 or the diagnosis device 6.

The internal vehicle communication units 23a and 23b are respectively connected to the communication lines 1a and 1b and communicate with the ECUs 3a to 3d via the connected communication lines 1a and 1b. The internal vehicle communication units 23a and 23b communicate with the ECUs 3a to 3d, for example, in accordance with a communication protocol such as CAN (Controller Area Network) or Flex Ray. The internal vehicle communication units 23a and 23b receive information by sampling and obtaining signals on the connected communication lines 1a and 1b and give the received information to the processing unit 21. The internal vehicle communication units 23a and 23b transmit information to the ECUs 3a to 3d by converting information to be transmitted that is given from the processing unit 21 to electrical signals and outputting the electrical signals to the communication lines 1a and 1b.

The external vehicle communication unit 24 is connected to the wireless communication device 4 via the communication line 1c. The external vehicle communication unit 24 transmits information to be transmitted that is given from the processing unit 21 to the wireless communication device 4 through the communication line 1c. By doing this, the wireless communication device 4 transmits information given from the gateway 2 to the server device 5 through wireless communication. Also, wireless communication device 4 transmits information received from the server device 5 through wireless communication to the gateway 2 through the communication line 1c. The external vehicle communication unit 24 can receive information transmitted from the server device 5 by receiving information from the wireless communication device 4.

The connector unit 25 is for connecting the connection cable 6a with which the diagnosis device 6 is provided. Note that, although FIG. 2 shows a configuration in which the connector unit 25 is provided in the gateway 2, it is not limited to this. The connector unit 25 may be provided at any appropriate place in the vehicle 1, separately from the gateway 2, and in this case, the connector unit 25 and the gateway 2 are connected via a connection line, for example. When the diagnosis device 6 is connected to the connector unit 25 via the connection cable 6a, the processing unit 21 of the gateway 2 can communicate with the diagnosis device 6 via the connector unit 25 and the connection cable 6a.

Also, in the gateway 2 according to this embodiment, the processing unit 21 executes the relay processing program 22a stored in the storage unit 22, and thus a relay processing unit 21a is realized in the processing unit 21 as a software-like functional block. Furthermore, the processing unit 21 executes the update processing program 22b stored in the storage unit 22, and thus an authentication processing unit 21b, an update processing unit 21c, and a prohibition processing unit 21d are realized in the processing unit 21 as software-like functional blocks.

The relay processing unit 21a performs processing for relaying communication between the communication lines 1a and 1b, by transmitting information received by the internal vehicle communication unit 23a from the internal vehicle communication unit 23b, or by transmitting information received by the internal vehicle communication unit 23b from the internal vehicle communication unit 23a. The relay processing unit 21a performs processing for relaying communication between the inside and outside of the vehicle 1 by transmitting information received by the external vehicle communication unit 24 from the internal vehicle communication units 23a and 23b, or by transmitting information received by the internal vehicle communication units 23a and 23b from the external vehicle communication unit 24. Also, the relay processing unit 21a may also perform information transmission after performing various types of processing such as processing for combining multiple pieces of information, processing for dividing one piece of information into multiple pieces of information, or calculation processing on numerical value information, on the information received by the internal vehicle communication unit 23a and 23b, or information received by the external vehicle communication unit 24, for example. Also, the relay processing unit 21a may also perform adjustment of the order of transmission of the received information, that is, processing for scheduling the relay.

The authentication processing unit 21b performs processing for determining whether or not a communication partner is legitimate, namely authentication processing, before performing update processing of the relay processing program 22a with the server device 5 or the diagnosis device 6. Upon receiving an authentication request from the server device 5 by the external vehicle communication unit 24, or upon receiving an authentication request from the diagnosis device 6 through the connector unit 25, the authentication processing unit 21b starts authentication processing. In authentication processing, whether or not the communication partner is legitimate is determined, for example, by exchanging information such as ID and password that are set in advance, between the gateway 2 and the server device 5 or the diagnosis device 6, and by determining whether or not the information is correct.

If the authentication processing unit 21b has determined that the communication partner that is the server device 5 or the diagnosis device 6 is legitimate, namely if the authentication processing was successful, the state of the gateway 2 according to this embodiment transitions from a normal processing mode in which processing for relaying communication is performed, to an update processing mode in which processing for updating the relay processing program 22a stored in the storage unit 22 is accepted. Upon transitioning to the update processing mode, the update processing unit 21c receives a new relay processing program 22a transmitted from the server device 5 or the diagnosis device 6, overwrites the relay processing program 22a stored in the storage unit 22 with the new relay processing program 22a, and thus performs updates of the relay processing program 22a (updates of the gateway 2).

In the gateway 2 according to this embodiment, the two methods for update processing of the relay processing program 22a are provided as described above, namely update processing performed by the server device 5 through wireless communication and update processing performed by the diagnosis device 6 through the connector unit 25. Specifically, the gateway 2 has a configuration in which updates of the relay processing program 22a can be performed using two communication paths, namely a communication path through wireless communication and a communication path through the connector unit 25. It should be noted that, in order to prevent an update of the relay processing program 22a from being performed through communication path other than the communication path used by the device with which authentication processing performed by the authentication processing unit 21b was successful, if authentication processing through either of the two communication paths was successful, the prohibition processing unit 21d of the gateway 2 according to this embodiment prohibits authentication processing through the other communication path thereafter.

The prohibition processing unit 21d, for example, has a register for storing information indicating whether to permit or prohibit authentication processing through wireless communication, and a register for storing information indicating whether to permit or prohibit authentication processing through the connector unit 25, and the prohibition processing unit 21d can control permit or prohibition of authentication processing by changing the values in these registers. When there is an authentication request, the authentication processing unit 21b refers to the values in these registers, and if the value that permits authentication processing is stored, performs the requested authentication processing, but if the value that prohibits authentication processing, does not perform the requested authentication processing.

Figure 3:
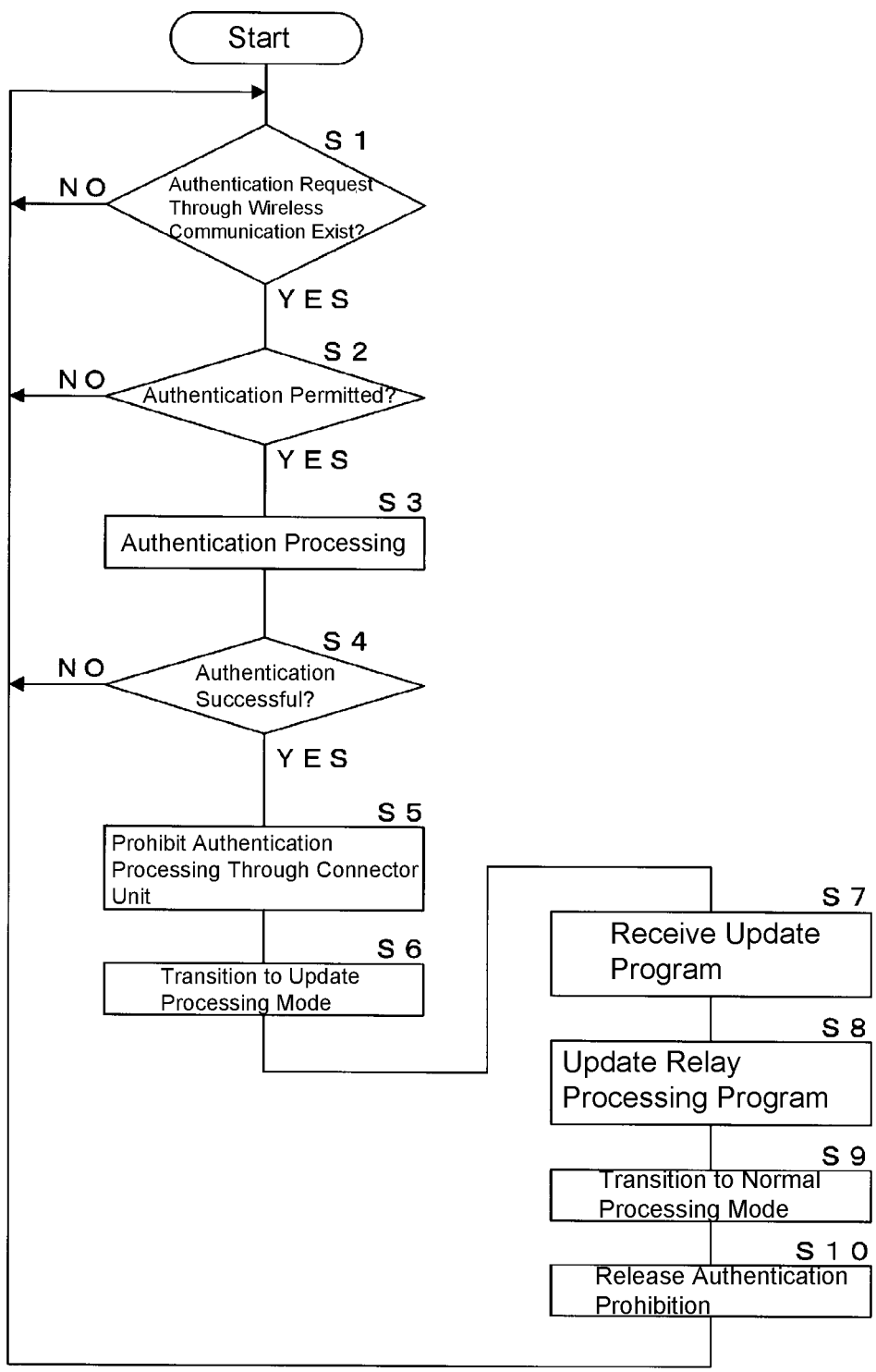
FIG. 3 is a flowchart showing a procedure of update processing performed by the gateway through wireless communication.

FIG. 3 is a flowchart showing a procedure of update processing performed by the gateway 2 through wireless communication. In the gateway 2 according to this embodiment, the external vehicle communication unit 24 obtains information received from the wireless communication device 4 through wireless communication, the processing unit 21 determines whether or not the obtained information is an authentication request, and thus it is determined whether there is an authentication request through wireless communication (step S1). If there is no authentication request through wireless communication (S1: NO), the processing unit 21 stands by until there is an authentication request. If there is an authentication request through wireless communication (S1: YES), the authentication processing unit 21b of the processing unit 21 determines whether or not an authentication processing through wireless communication is permitted (step S2). If an authentication request through wireless communication is prohibited (S2: NO), the authentication processing unit 21b returns to step S1 without performing authentication processing.

If authentication processing through wireless communication is permitted (S2: YES), the authentication processing unit 21b performs authentication processing with the communication partner that has issued an authentication request (step S3). The authentication processing unit 21b determines whether or not the authentication was successful as a result of the authentication processing (step S4). If the authentication has failed (S4: NO), the authentication processing unit 21b returns to step S1.

If the authentication was successful (S4: YES), the prohibition processing unit 21d of the processing unit 21 prohibits authentication processing through the connector unit 25 (step S5). The processing unit 21 transitions from the normal processing mode in which relay processing is performed to the update processing mode in which the relay processing program 22a is updated (step S6). The update processing unit 21c of the processing unit 21 receives the update relay processing program 22a that is wirelessly transmitted from the server device 5 by the wireless communication device 4 via the external vehicle communication unit 24 (step S7). The update processing unit 21c updates the relay processing program 22a by overwriting the relay processing program 22a stored in the storage unit 22 with the received update relay processing program 22a (step S8). After finishing the update, the processing unit 21 transitions from the update processing mode to the normal processing mode (step S9). The prohibition processing unit 21d releases the prohibition of authentication processing through the connector unit 25 (step S10) and returns to step S1.

Figure 4:
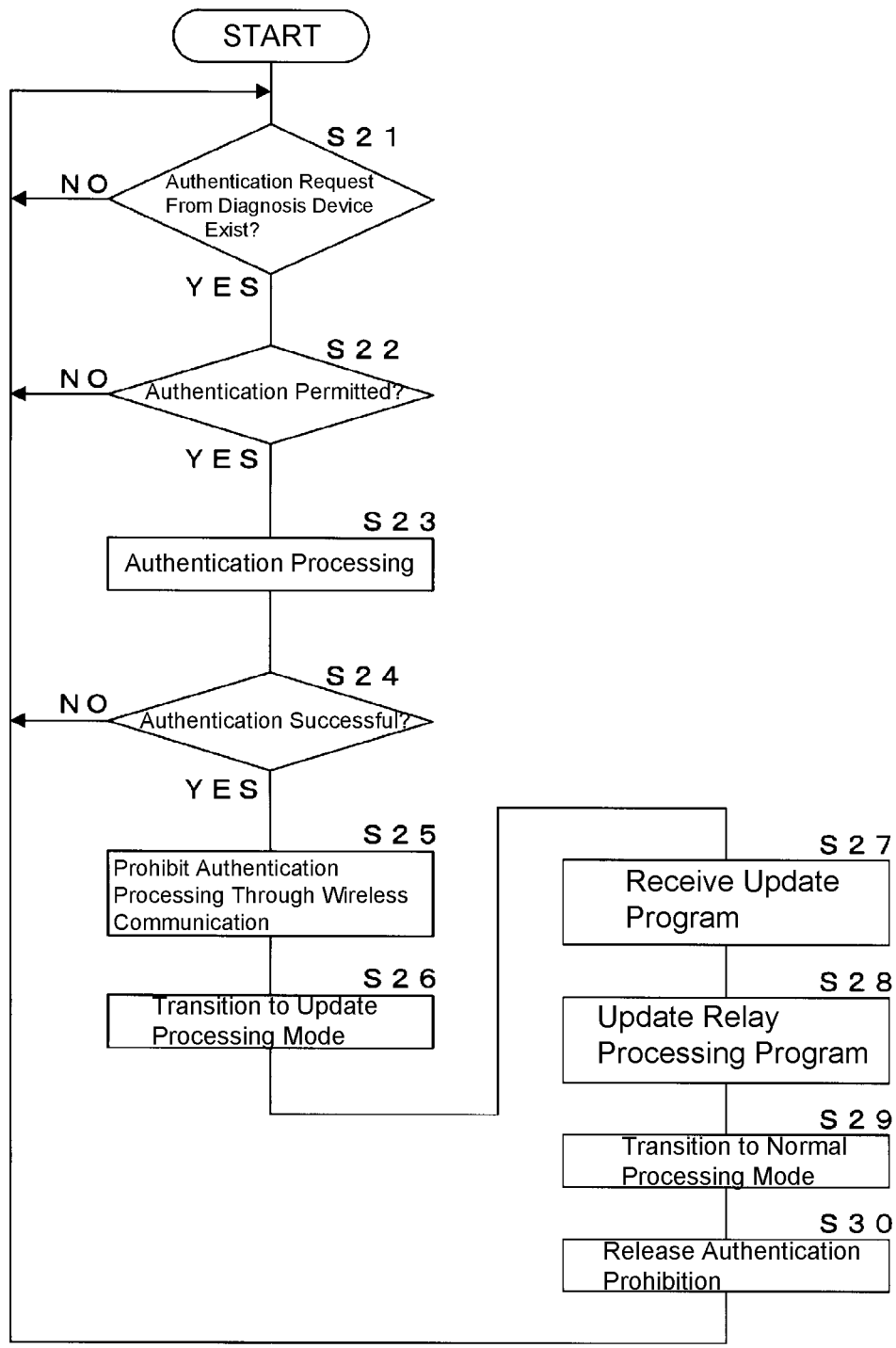
FIG. 4 is a flowchart showing a procedure of update processing performed by the gateway through a connector unit.

FIG. 4 is a flowchart showing a procedure of update processing performed by the gateway 2 through the connector unit 25. In the gateway 2 according to this embodiment, when the diagnosis device 6 is connected to the connector unit 25 via the connection cable 6a, communication with the diagnosis device 6 through the connector unit 25 and the connection cable 6a becomes possible. With this communication, the processing unit 21 of the gateway 2 determines whether there is an authentication request from the diagnosis device 6 through the connector unit 25 and the communication cable 6a (step S21). If there is no authentication request from the diagnosis device 6 (S21: NO), the processing unit 21 stands by until there is an authentication request. If there is an authentication request from the diagnosis device 6 (S21: YES), the authentication processing unit 21b of the processing unit 21 determines whether or not authentication processing through the connector unit 25 is permitted (step S22). If an authentication request through the connector unit 25 is prohibited (S22: NO), the authentication processing unit 21b returns to step S21 without performing authentication processing.

If authentication processing through the connector unit 25 is permitted (S22: YES), the authentication processing unit 21b performs authentication processing using communication with the diagnosis device 6 through the connector unit 25 (step S23). The authentication processing unit 21b determines whether or not the authentication was successful as a result of the authentication processing (step S24). If the authentication has failed (S24: NO), the authentication processing unit 21b returns to step S21.

If the authentication was successful (S24: YES), the prohibition processing unit 21d of the processing unit 21 prohibits authentication processing through wireless communication (step S25). The processing unit 21 transitions from the normal processing mode in which relay processing is performed to the update processing mode in which the relay processing program 22a is updated (step S26). The update processing unit 21c of the processing unit 21 receives the update relay processing program 22a transmitted from the diagnosis device 6 through the connector unit 25 (step S27). The update processing unit 21c updates the relay processing program 22a by overwriting the relay processing program 22a stored in the storage unit 22 with the received update relay processing program 22a (step S28). After finishing the update, the processing unit 21 transitions from the update processing mode to the normal processing mode (step S29). The prohibition processing unit 21d releases the prohibition of authentication processing through wireless communication (step S30) and returns to step S21.

The gateway 2 according to this embodiment with the above configuration is provided with the external vehicle communication unit 24 that performs communication processing through a wireless communication path using the wireless communication device 4, the connector unit 25 that performs communication processing through a communication path using the communication cable 6a that can be attachably/removably connected, and the internal vehicle communication units 23a and 23b that perform communication processing through communication path using the communication lines 1a and 1b inside the vehicle 1. In the on-board communication system according to this embodiment, update processing of the relay processing program 22a of the gateway 2 can be performed by using the wireless communication path through the wireless communication device 4 or the communication path through the communication cable 6a connected to the connector unit 25. It should be noted that, in this embodiment, update processing of the relay processing program 22a using the communication path through the communication lines 1a and 1b inside the vehicle 1 cannot be performed. Even if the gateway 2 receives an authentication request by the internal vehicle communication units 23a and 23b through the communication lines 1a and 1b, for example, the gateway 2 does not perform authentication processing in accordance with this request. However, the on-board communication system may be configured to be capable of performing update processing of the relay processing program 22a through the communication lines 1a and 1b.

Upon receiving an authentication request through either of the wireless communication path or the communication path using the connector 25, the authentication processing unit 21b of the gateway 2 according to this embodiment performs authentication processing by performing transmission/reception of information such as ID and password through this communication path. If the authentication processing was successful, the update processing unit 21c of the gateway 2 receives the update relay processing program 22a through this communication path and performs update processing by overwriting the relay processing 22a stored in the storage unit 22. Also, at this time, the prohibition processing unit 21d of the gateway 2 prohibits update processing through any communication path other than the communication path through which the authentication processing was performed, by prohibiting authentication processing through any communication path other than the communication path through which the authentication processing was performed. With this configuration, after authentication processing through one communication path was successful and the gateway 2 transitioned to the update processing mode, it is possible to prevent update processing through the other communication path from being performed and to prevent update processing from being performed without limitation.

In this embodiment, a configuration was described in which, if the authentication processing through one communication path was successful, the gateway 2 prohibits authentication processing through the other communication path. But, the present description is not limited to this. A configuration is also possible in which, for example, the gateway 2 performs authentication processing through any other communication path if authentication processing through one communication path was successful, but does not perform update processing through the other communication path even if authentication processing was successful. A configuration as described in the following Modification 1 is also possible, for example.

Modification 1

If authentication processing using the wireless communication device 4 through the wireless communication path was successful, the gateway 2 according to Modification 1 suspends operations of the connector unit 25 and the internal vehicle communication units 23a and 23b and prohibits communication through them. On the other hand, if authentication processing through the communication path using the connector unit 25 was successful, the gateway 2 suspends the external vehicle communication unit 24 and the internal vehicle communication units 23a and 23b, that are connected to the wireless communication device 4, and prohibits communication through them. In this way, the gateway 2 according to Modification 1 may perform prohibition processing by suspending operations of the external vehicle communication unit 24, the connector unit 25, the internal vehicle communication units 23a, and 23b, the operations relating to any communication path other than the communication path through which the authentication processing was successful.

Also, in this embodiment, the specific processing to be performed after succeeding in authentication processing is update processing in which the relay processing program 22a of the gateway 2 is updated. However, the specific processing is not limited to this, and a configuration is also possible in which various processing other than this is performed. A configuration is also possible in which the specific processing to be performed includes processing such as processing for making the vehicle 1 perform self-diagnosis, processing for changing control parameters relating to driving of the vehicle 1, or processing for transmitting information accumulated in a database provided in the vehicle 1 to the outside. Configurations described in the following Modifications 2 and 3 are also possible, for example.

Modification 2

In an on-board communication system according to Modification 2, the storage unit 22 of the gateway 2 stores various types of data to be used when performing relay processing performed by the relay processing program 22a. If authentication processing through either the wireless communication path or the communication path using the connector unit 25 was successful, the gateway 2 according to Modification 2 receives update data through this communication path and performs update processing in which data stored in the storage unit 22 is overwritten. At this time, the prohibition processing unit 21d of the gateway 2 prohibits update processing through any communication path other than the communication path through which the authentication processing was performed. In other words, in the on-board communication system according to Modification 2, processing for updating data stored in the storage unit 22 of the gateway 2 is performed as the specific processing.

Modification 3

In an on-board communication system according to Modification 3, the gateway 2 provides a debug mode in which a system developer or the like verifies the device operation. When there is a transition instruction to the debug mode from a partner with which authentication processing was successful, the gateway 2 transitions from the normal operation mode to the debug mode. In the debug mode, the gateway 2 accepts a special operation order which is not accepted in the normal mode and performs operation in accordance with this operation order. Also, in the debug mode, the gateway 2 transmits a special information which is not transmitted to the outside in the normal mode to the partner with which authentication processing was successful. If authentication processing through either the wireless communication path or the communication path using the connector unit 25 was successful, the gateway 2 according to Modification 3 accepts the transition instruction to the debug mode, given through this communication path. At this time, the prohibition processing unit 21d of the gateway 2 prohibits acceptance of the transition instruction to the debug mode through any communication path other than the communication path through which the authentication processing was performed. In other words, in the on-board communication system according to Modification 3, processing for transmitting/receiving information for performing operation verification of the gateway 2 is performed as the specific processing.

Also, in this embodiment, a configuration was described in which authentication processing by wireless communication is performed by the gateway 2. However, the present description is not limited to this. A configuration is also possible in which the wireless communication device 4 performs authentication processing and relays communication between the gateway 2 and the server device 5 if authentication processing was successful. In the case of this configuration, for example, a configuration is possible in which, if the authentication through the connector unit 25 was successful, the gateway 2 outputs an authentication-processing prohibition instruction to the wireless communication device 4, and the wireless communication device 4 does not perform authentication processing in accordance with this instruction. In this way, functions of the gateway 2, processing performed by the gateway 2, and the like in this embodiment may be realized through cooperation of a plurality of devices.

Also, in this embodiment, a configuration is described in which the wireless communication device 4 is mounted in the vehicle 1, but the present description is not limited to this. A configuration is also possible in which, a portable communication device owned by the user is connected to the gateway 2 by wire or wirelessly, and the gateway 2 communicates with the server device 5 or the like using this communication device, for example. Also, a configuration was described in which a diagnosis device 6 is connected by wire to the vehicle 1 via the connection cable 6a, but the present description is not limited to this. A configuration is also possible in which the diagnosis device 6 is wirelessly connected. Also, a configuration is also possible in which the gateway 2 is provided with a function for performing wireless communication. A configuration as described in the following Modification 4 is also possible, for example.

Modification 4

Figure 5:
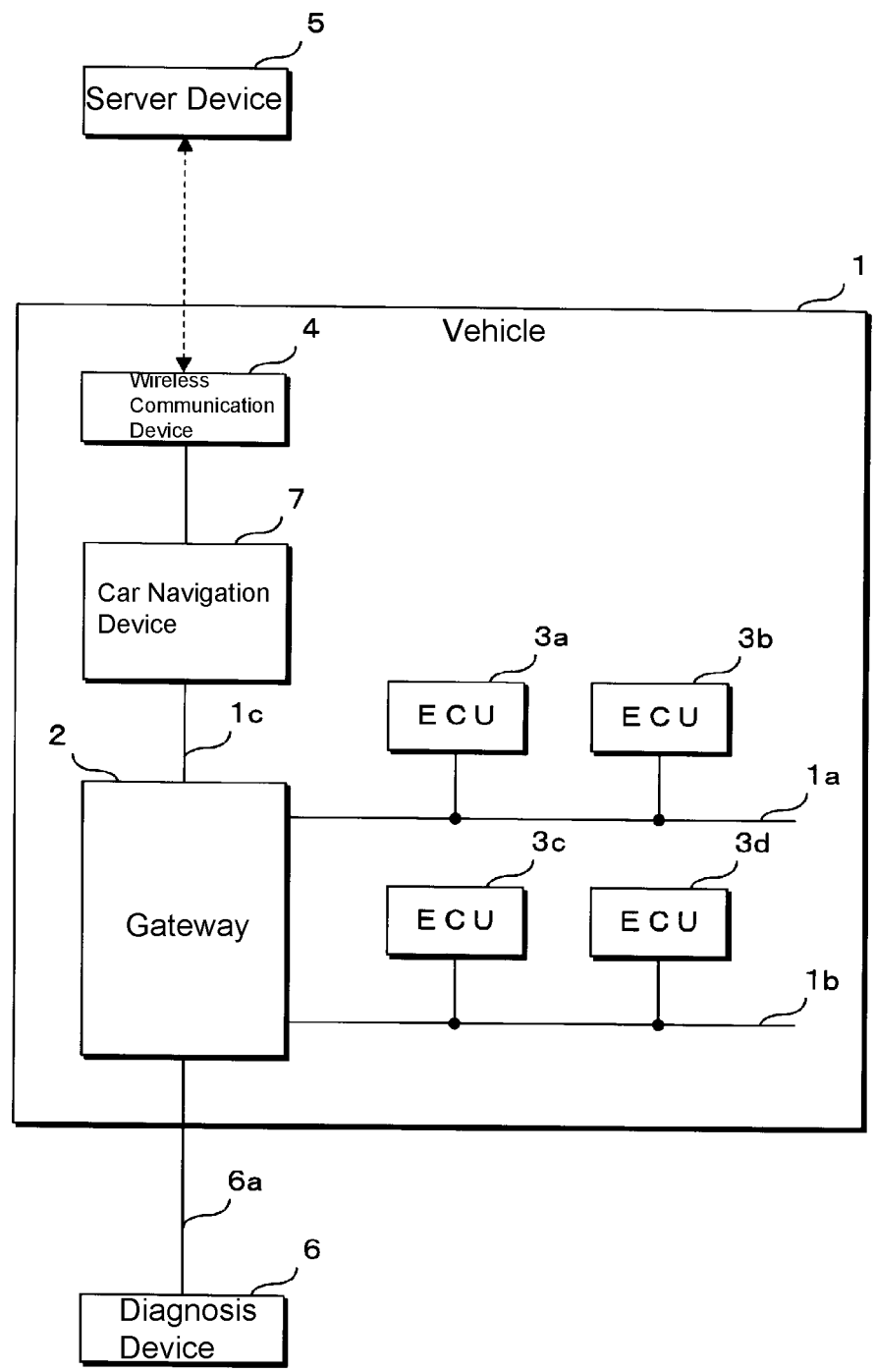
FIG. 5 is a block diagram showing a configuration of an on-board communication system according to Modification 4.

FIG. 5 is a block diagram showing a configuration of an on-board communication system according to Modification 4. The on-board communication system according to Modification 4 has a configuration in which a car navigation device 7 is interposed between the gateway 2 and the wireless communication device 4 in the on-board communication system shown in FIG. 1. The car navigation device 7 is a device that performs driving route guidance using GPS (Global Positioning System) and that obtains map information from the server device 5 using the wireless communication device 4, for example. In the case of the above-described configuration in which the car navigation device 7 is interposed between the gateway 2 and the wireless communication device 4, authentication processing with the server device 5 may be performed by any of the gateway 2, the wireless communication device 4, and the car navigation device 7.

If the gateway 2 performs authentication processing, the wireless communication device 4 and the car navigation device 7 relays information relating to authentication processing transmitted/received between the gateway 2 and the server device 5. If the car navigation device 7 performs authentication processing, the wireless communication device 4 relays information transmitted/received between the car navigation device 7 and the server device 5, and the car navigation device 7 notifies the gateway 2 of the authentication processing result. If the wireless communication device 4 performs authentication processing, the car navigation device 7 relays transmission/reception of the authentication processing result from the wireless communication device 4 to the gateway 2.

When authentication processing with the server device 5 is performed by any device, if authentication processing was successful, the gateway 2 according to Modification 4 prohibits authentication processing with the diagnosis device 6 through the connector unit 25. On the other hand, if authentication processing with the diagnosis device 6 through the connector unit 25 was successful, the gateway 2 prohibits authentication processing with the server device 5 using wireless communication performed by the device (any one of the gateway 2, the wireless communication device 4, or the car navigation device 7) that should perform authentication processing with the server device 5.

It should be noted that, although a configuration in which the car navigation device 7 is interposed between the gateway 2 and the wireless communication device 4 was described in Modification 4, the present description is not limited to this. For example, a configuration is also possible in which another device such as another gateway or a domain controller is interposed therebetween.

Also, in this embodiment, the communication paths through which the gateway 2 prohibits authentication processing were described by listing the two communication paths, namely the communication path through wireless communication and the communication path through the connector unit 25, but the communication paths are not limited to these two. Also, three or more communication paths may be provided. Also, the plurality of communication paths need not be communication paths that are physically different, and for example, the plurality of communication paths may be logic communication paths (communication paths with which communication is physically performed through one communication line, for example, but logically handled as different communication lines) such as a port compliant with the TCP/IP standard and a pipe compliant with the USB (Universal Serial Bus) standard.

LIST OF REFERENCE NUMERALS

1: Vehicle
1a to 1c: Communication line
2: Gateway (on-board communication device)
3a to 3d: ECU
4: Wireless communication device
5: Server device
6: Diagnosis device
6a: Communication cable
21: Processing unit
21a: Relay processing unit
21b: Authentication processing unit
21c: Update processing unit (specific processing unit)
21d: Prohibition processing unit
22: Storage unit
22a: Relay processing program
22b: Update processing program
23a and 23b: Internal vehicle communication unit
24: External vehicle communication unit
25: Connector unit (connection unit)

The invention claimed is:

1. An on-board communication device that is mounted in a vehicle and is provided with a plurality of communication processing units that each perform communication processing through at least two communication paths, the on-board communication device configured to receive data from a first device and a second device, the first device transmitting data through a wireless communication path of the at Last two communication paths and the second device transmitting data through a wired communication path of the at least two communication paths, the on-board communication device comprising:

a hardware processor communicatively coupled to a memory;

an authentication processing unit that performs authentication processing with the first device or the second device;

a specific processing unit that performs specific processing with the first device or the second device through the corresponding wireless communication path or the wired communication path if the authentication processing performed by the authentication processing unit was successful, wherein the specific processing performed by the specific processing unit is processing for updating a program or data stored in a device mounted in the vehicle using a program or data received from the communication path in which authentication was successful;

and a prohibition unit that prohibits the specific processing through any communication path other than the wireless communication path or wired communication path in which if the authentication processing performed by the authentication processing unit was successful, accordingly in the event the first device is authenticated, the specific processing through the wired communication path is Prohibited and in the event the second device is authenticated, the specific processing though the wireless communication path is prohibited.

2. The on-board communication device according to claim 1,
wherein the prohibition unit prohibits authentication processing with the authentication processing unit based on an authentication processing request given through any of the at least two communication paths other than the communication path in which authentication was successful.

3. The on-board communication device according to claim 1, wherein the specific processing performed by the specific processing unit further includes processing for transmission/reception of information for operation verification, to and from the on-board communication device mounted in the vehicle.

4. The on-board communication device according to claim 1, wherein the wireless communication path is configured to wirelessly transmit/receive data to/from the first device, the first device being outside of the vehicle.

5. The on-board communication device according to claim 1, wherein the wired communication path is configured to transmit/receive data to/from the second device through a connection unit that is disposed in the vehicle, and wherein the second device is attachably/removably connected to the connection unit.

6. An on-board communication system provided with a plurality of communication devices that each perform communication processing through a predetermined communication path of a plurality of communication paths, the on-board communication system comprising: a hardware processor communicatively coupled to a memory:
an authentication processing unit that performs authentication processing with the plurality of communication devices;
a specific processing unit that performs specific processing with the plurality of communication devices through the corresponding predetermined communication path if the authentication processing performed by the authentication processing unit was successful, wherein the specific processing performed by the specific processing unit is processing for updating a program or data stored in a device mounted in the vehicle using a program or data received from the communication path in which authentication was successful;
a prohibition unit that prohibits the specific processing through any communication path other than the predetermined communication path if the authentication processing performed by the authentication processing unit was successful.

7. A specific processing prohibition method for a vehicle performed by an on-board communication device that is mounted in a vehicle and is provided with a plurality of communication processing units that each perform communication processing through a wireless communication path or a wired communication path, the specific processing prohibition method for a vehicle comprising:
performing authentication processing with a first or a second device when there is an authentication processing request from the first or second device, wherein the first device is configured to transmit data through the wireless communication path and the second device is configured to transmit data through the wired communication path;
performing specific processing with the first device or the second device through the corresponding wireless or wired communication path if authentication processing performed by the authentication processing unit was successful, wherein the specific processing performed by the specific processing unit is processing for updating a program or data stored in a device mounted in the vehicle using a program or data received from the communication path in which authentication was successful; and
prohibiting the specific processing through the wireless communication path if the authentication processing performed by the authentication processing unit as a result of a request from the second device was successful and prohibiting the specific processing through the wired communication path if the authentication processing performed by the authentication processing unit as a result of a request from the first device was successful.

* * * * *